Oct. 13, 1953         C. BELSKY         2,655,382
PUZZLE
Filed April 26, 1949
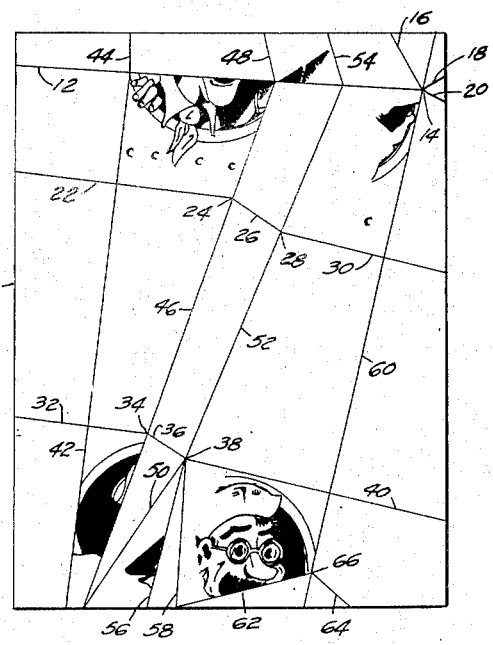
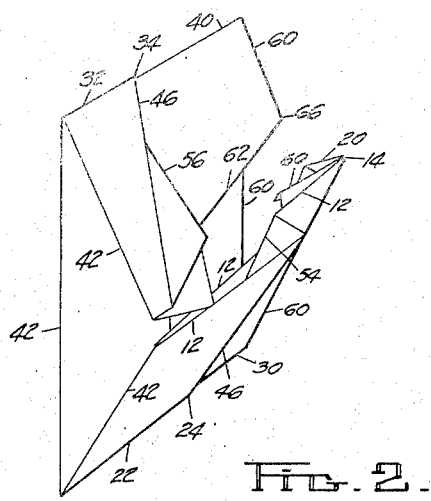
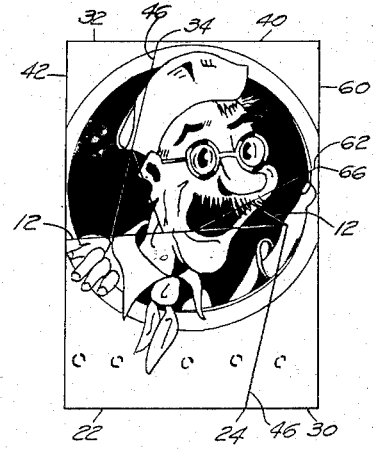
INVENTOR.
CHARLES BELSKY
BY
C. H. Fowler Patented Oct. 13, 1953

2,655,382

UNITED STATES PATENT OFFICE 2,655,382

PUZZLE

Charles Belsky, Detroit, Mich.

Application April 26, 1949, Serial No. 89,664

3 Claims. (Cl. 273—155)

This invention relates to games, and more particularly to puzzles.

Broadly, the invention comprehends a puzzle comprising a single sheet of paper having imposed on one side thereof definite lines on which the sheet is to be folded and separate and distinct portions of a picture, a figure and/or literature, each portion being associated with at least one of the lines and also being complementary to at least one other portion of the picture, figure or literature, so that when the sheet is properly folded on the indicated lines the picture, the figure and/or the literature will be presented in its entirety.

An object of the invention is to provide a puzzle similar in some respects to a one piece jigsaw puzzle and yet vastly different in that the various parts or portions of a picture, a figure and/or literature are disposed on one side of a sheet of paper which when properly folded on indicated lines will reveal the picture, the figure and/or the literature in its entirety.

Another object of the invention is the production of a unique puzzle comprising a single sheet of paper having imposed upon one side thereof arbitrarily selected lines on which the sheet is to be folded to present a substantially flat rectangular surface traversed by a multiplicity of folded edges at least some of which interlock.

Yet another object of the invention is to produce a puzzle comprising a rectangular sheet of paper having thereon a multiplicity of lines which may be of an infinitely varied number defining the boundaries of triangles, trapezoids, rectangles and/or other geometrical figures, and on which the sheet may be folded to present a substantially flat rectangular surface of less area than the sheet before folding.

Other objects of the invention will appear from the following description when taken in connection with the drawings forming a part of this specification and in which:

Fig. 1 is a plan view.

Fig. 2 is a perspective view, and

Fig. 3 is a front elevation illustrating the puzzle as solved.

As shown, the puzzle consists of a rectangular sheet of paper having arranged on one side thereof only a number of lines depicting the boundaries of triangles, trapezoids, rectangles and other geometrical figures on which the sheet is to be folded, and dispersed portions of a picture each having a boundary at least a portion of which coincides with one or more of the lines so that when the sheet is properly folded on the indicated lines the dispersed portions of the picture will be assembled or brought into juxtaposition with relation to one another so as to present the picture in its entirety.

It is to be observed that the lines on which the sheet is to be folded are indicated on one side of the sheet only without any indication whatsoever as to the direction of fold and that a number of the multiple sided outlines created by the lines of fold are disposed within the folded rectangle without image and hidden from view to make possible the disclosure of the picture, the figure and/or the literature.

It is also to be observed that the folds may radiate about a common point, and that other folds are tucked into the folds, an operation which cannot be complete until two other folds are placed in the correct relative position with relation to one another, and that in addition the multiple sided geometrical figures created by the lines of fold which have portions of a picture thereon within the figures are so arranged that the raw edges of the original rectangular sheet are not employed to create a margin of relative registration of the matched portions of the picture. In short, all relative registrations of the various portions of the picture are accomplished on the lines of fold.

From the foregoing, it is obvious that the invention has many ramifications and accordingly infinitely varied patterns may be had. In other words, many different puzzles may be made by changing the lines of fold.

Referring now to the accompanying drawings, 10 represents a rectangular sheet of paper having imposed thereon arbitrarily selected lines of fold. As shown, a transversely disposed line of fold 12 extends from one edge of the sheet to a point 14 adjacent the other edge, and lines of fold 16, 18 and 20 diverge from the point 14 to the edges of the sheet.

Another transversely disposed line of fold 22 extends from one edge of the sheet to a point 24 substantially centrally of the width of the sheet and from the point 24 a short line of fold 26 diverges downwardly to a point 28 and from the point 28 a line of fold 30 extends to the other edge of the sheet.

Yet another transversely disposed line of fold 32 extends from the same edge of the sheet to a point 34 located approximately one-third of the width of the sheet. A short line of fold 36 diverges from the point 34 downwardly to a point 38 and a line of fold 40 extends from the point 38 to the other edge of the sheet.

An oblique line of fold 42 extends from the bottom of the sheet upwardly to the line of fold 12 and a relatively short line of fold 44 extends from the juncture of the lines of fold 12 and 42 to the upper edge of the sheet.

Another oblique line of fold 46 extends from the bottom edge of the sheet upwardly to the line 12, and a relatively short line of fold 48 extends from the juncture of the lines 12 and 46 to the upper edge of the sheet.

Yet another oblique line of fold 50 extends upwardly to the point 38 at the juncture of the lines of fold 36 and 40 and a line of fold 52 extends from the point 38 upwardly to line of fold 12, and a relatively short line of fold 54 extends from the juncture of lines 12 and 52 to the upper edge of the sheet.

Two short lines of fold 56 and 58 extend from the bottom of the sheet upwardly to the point 38 and an oblique line of fold 60 extends from the bottom of the sheet upwardly through the point 14 to the upper edge of the sheet, and two lines of fold 62 and 64 extend from the bottom of the sheet upwardly to a point 66 on the line of fold 60.

In practice the designated lines of fold having been arbitrarily selected and plotted, a layout employing descriptive geometry is made so as to check the dimensional accuracy of the folds, and the geometrical figures in which portions of the picture are to be located are identified.

A composite layout showing the figures for the assembled picture is made. The art work is then accomplished and a transparency from the composite layout is laid over the art work and a tracing made thereof and then the segments of the picture are transferred to the flat overall pattern accurately.

In working the incident puzzle, the sheet may be folded backwardly along the line of fold 12 to the point 14. It is then folded backwardly on the line of fold 60, also on the lines of fold 16, 18 and 20 to form a corner at point 14.

The sheet is then folded on its face along the line of fold 52 to the point 38, thence along the line of fold 58, also on the face and then backwardly on the line of fold 56 and then under on the line of fold 46.

The sheet is then folded backwardly along the line of fold 42 and also along the line of fold 62.

When so folded the lines 22 and 30 coincide, also the lines 32 and 40 coincide. Under this condition the sheet is then folded backwardly along the lines of fold 22 and 30, and also the lines of fold 32 and 40. The raw edge of the sheet, that is, the edge normally at the bottom of the sheet is then tucked in a fold made along the lines of fold 12, 22 and 42 so as to interlock and retain the solved puzzle displaying the picture in its entirety.

Although this invention has been described in connection with certain specific embodiments the principles involved are susceptible to numerous other applications that will readily occur to persons skilled in the art. The invention is, therefore, to be limited only as indicated by the scope of the appended claims.

Having thus described my invention what I claim is new and desire to secure by Letters Patent is:

1. A puzzle comprising a single rectangular sheet of paper, arbitrarily selected lines imposed thereon defining the boundaries of a number of differently shaped and different sized geometrical figures, portions of a picture in some of the geometrical figures, said sheet to be folded on the arbitrarily selected lines so that the folded edges of some of the boundary lines of one or more of the geometrical figures will register with some of the boundary lines of other geometrical figures with at least some of the folds interlocking so that the sheet when folded presents a rectangular member of less area than the sheet before folding and a complete picture.

2. A puzzle comprising a single rectangular sheet of paper, arbitrarily selected lines imposed thereon, said lines defining different boundary lines between differently shaped and different sized geometrical figures, portions of a picture in some of the geometrical figures, said sheet to be folded on the arbitrarily selected lines in such manner that at least some of the boundary lines of one or more of the geometrical figures will register with some of the boundary lines of other geometrical figures and that some of the folds will interlock with other folds so as to retain the sheet folded into a rectangular member of less area than the sheet before folding and form the picture in its entirety.

3. A puzzle comprising a rectangular sheet of paper having thereon arbitrarily selected lines defining the boundary lines between differently shaped and different sized geometrical figures, dispersed portions of a picture each arranged in a different geometrical figure adjacent one or more of the arbitrarily selected lines with some portions of the picture facing in the same direction and other portions of the picture facing in the reverse direction, said sheet to be folded on the arbitrarily selected lines in such manner that at least some of the folds interlock with other folds whereby the sheet may be folded into a rectangular member of less area than the sheet before folding and the picture formed and retained in its entirety.

CHARLES BELSKY.

References Cited in the file of this patent

UNITED STATES PATENTS

| Number | Name | Date |
|---|---|---|
| 478,474 | Schwanenberger | July 5, 1892 |
| 1,052,322 | Crowell | Feb. 4, 1913 |
| 1,620,053 | Arundel | Mar. 8, 1927 |
| 2,259,205 | Heilpern | Oct. 14, 1941 |
| 2,293,215 | Polgar | Aug. 18, 1942 |
| 2,395,247 | Buffenbarger | Feb. 19, 1946 |
| 2,399,000 | Carroll | Apr. 23, 1946 |